Dec. 15, 1959 W. F. SANBORN ET AL 2,917,266
ANCHORING DEVICE FOR ELECTRONIC EQUIPMENT
Filed Aug. 3, 1956
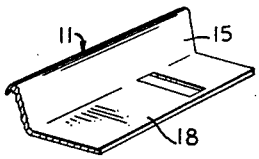
FIG.8
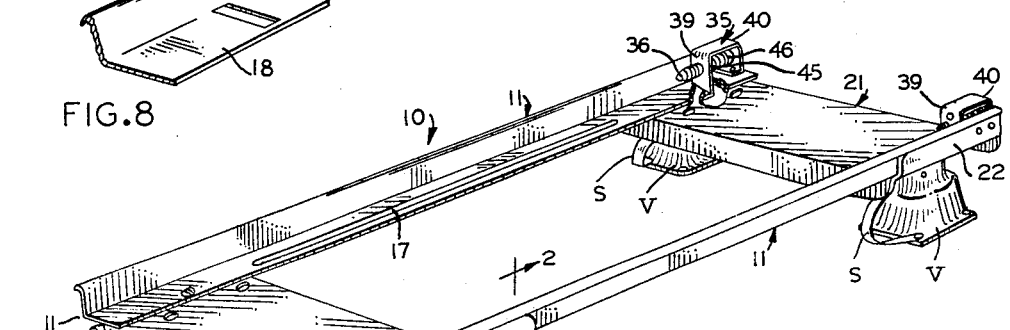
FIG.1
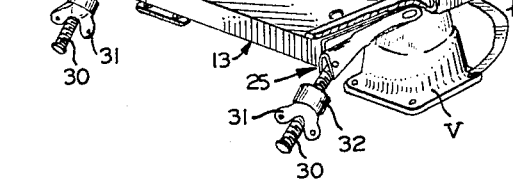
FIG.4
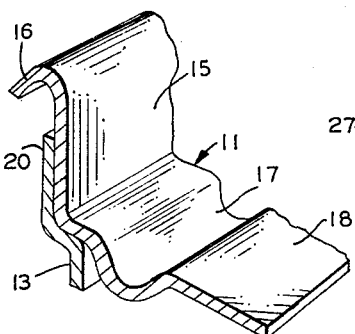
FIG.2
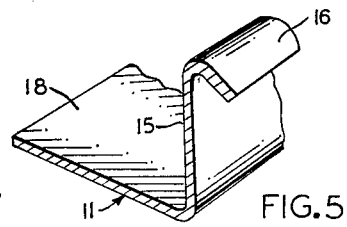
FIG.5
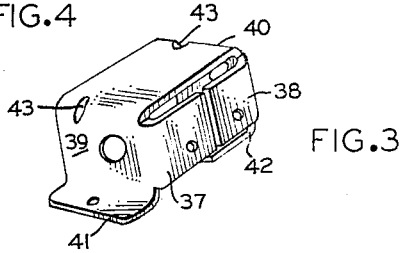
FIG.3
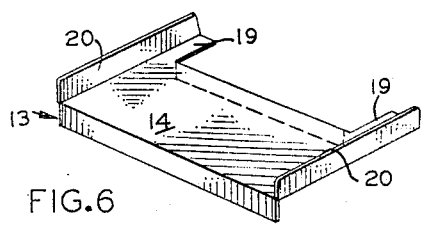
FIG.6
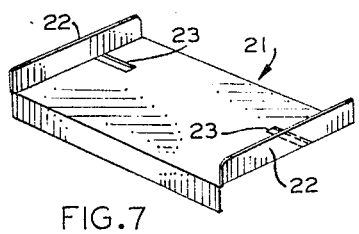
FIG.7
INVENTORS
WALTER F. SANBORN
JOHN N. MACDUFF
BY
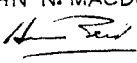
ATTORNEY United States Patent Office 2,917,266
Patented Dec. 15, 1959

2,917,266

ANCHORING DEVICE FOR ELECTRONIC EQUIPMENT

Walter F. Sanborn, Charlotte, N.C., and John N. Macduff, Troy, N.Y., assignors to Pneumafil Corporation, Charlotte, N.C., a corporation of Delaware Application August 3, 1956, Serial No. 602,027

2 Claims. (Cl. 248—361)

This invention relates to a novel mounting structure, more particularly to a mounting structure designed to facilitate the mounting of a member in a relatively vibration-free manner.

Contemporary technological advances have given rise to numerous situations wherein it is desirable to prevent the transmission of vibrations produced in one machine component to any other adjacent members. Thus, in the aircraft industry, the need has arisen for providing some means for mounting electronic and the like equipment in aircraft, whereby the vibrations inherent in the normal functioning of the aircraft are prevented from exercising a deleterious effect upon the components of the electronic equipment. As is apparent, excessive shaking serves only to dimish the life, and affect the operation of conventional radio tubes, condensers, or the like. Conventional vibration isolating techniques employ so-called "isolators" which generally comprise some spring means encased in a housing positioned between the vibration source and the member to be isolated. These spring means serve in an obvious fashion to absorb and dissipate any vibration energy transmitted thereto. Problems, however, arise in connection with the proper securement of the members to be isolated to the isolator. Thus, it is desirable that means be provided which function to securely support a member in relatively vibration-free isolation, and at the same time permit ready removal and interchange of said member, and serve to securely maintain the member in desired position. Further difficulties are engendered due to the necessity of providing a relatively rigid supporting structure, which should notwithstanding be of a light weight.

It is with the above problems in mind that the present construction has been evolved, a relatively rigid light weight construction serving to facilitate the mounting of a member in isolation from a vibration source, and at the same time permitting the ready removal of said member for maintenance purposes.

It is accordingly a primary object of this invention to provide improved supporting means for facilitating the mounting of a member in isolation from a vibration source.

A further object of this invention is to provide a mounting base for use in conjunction with vibration isolators which facilitates the vibration-free mounting of a member in conjunction with a vibration source.

Another object of this invention is to provide a relatively light weight mounting base of great structural strength, not subject to distortion.

It is also an object of this invention to provide a mounting base with engaging members, adapted to detachably engage with any member supported on said base.

These and other objects of this invention, which will become apparent from the following description and claims, are achieved by provision of a base framework, of a configuration approximating that of the member to be supported. Vibration isolators of any conventional type are positioned at spaced points in conjunction with the mounting base. An embossed strap anchor is provided in conjunction with an attaching means such as a bolt or the like, said strap being secured at one end to the framework of the base, and at its other end engaging the member to be supported. Remote from the strap anchor, a hold-down anchor comprising a boxlike plunger housing, having flanges on opposite ends, both flanges extending in the same direction, is secured to the framework to facilitate removable securement of the member to said base. To achieve rigidity without increasing weight, the framework of the base is made up with an embossed rail and a rolled flange.

The specific constructional features of a preferred embodiment of this invention, and their mode of functioning will be made most manifest and particularly pointed out in conjunction with the accompanying drawings, herein:

Figure 1, represents a perspective view of a preferred embodiment of this invention;

Figure 2, represents a cross sectional view through the side rails taken on line 2—2 of the novel mounting base, illustrating the details of the embossed strengthened channel;

Figure 3, represents a perspective view of the hold-down anchor housing for the spring pressed engaging means;

Figure 4, represents a perspective view of the front connector strap anchor;

Figure 5, represents a cross sectional view through the side rails illustrating the rolled flanged construction thereof;

Figure 6, is a perspective view of the front end piece of the novel base;

Figure 7, is a perspective view of the rear end piece of the base; and

Figure 8, is a detail of the rear portion of the base illustrating a preferred mode of securing an anchoring member to the base.

Referring now more particularly to the drawings, like numerals in the various figures will be taken to designate like parts.

The novel mounting base 10, as best seen in Figure 1, comprises a framework, here shown as of a rectangular configuration, but obviously subject to formation in any desired shape. The framework employed is such as to permit seating thereon of the base portion of any member to be supported in relatively vibration-free isolation.

In the rectangular configuration found to have most general utility and illustrated in Figure 1, the base 10 is formed with side rails 11, which extend parallel to each other.

Side rails 11, as best seen in Figures 2 and 5, are of a right angle shape with the normally upstanding leg 15 provided with outwardly and downwardly extending flange 16. At the central portion of the side rail, extending substantially along the length of the rail between front end piece 13 and rear end piece 21, an emboss 17 is formed in horizontally extending leg 18 of the side rails 11.

Front end piece 13, as best seen in Figures 1 and 6, is formed with a body portion 14 of a channel shape provided with extensions 19. The channel end portions are upturned to form flanges 20 extending along extensions 19 and, as seen in the drawing, are arranged to lie flush against upstanding leg 15 of the side rails 11.

Rear end piece 21, as best seen in Figures 1 and 7, is a channel member having upwardly bent end pieces 22 arranged to engage leg 15, similarly to flange 20. Slots 23 are formed for a purpose to be made hereinafter more apparent.

Anchoring members for securing an article on the base are provided of any suitable type. Two suggested preferred types embodying the instant inventive concept are illustrated in detail in Figures 3 and 4. The front connector strap anchor 25, best seen in Figure 4, is formed with a dished emboss 26. The dished emboss 26 is formed with a central aperture 27 through which a suitable fastening member such as a rivet bolt or the like may readily be passed. The forward end of strap 25 is formed as a channel 27 of gradually increasing depth and provided with a pin 28 at the deepest portion of the channel. In addition to the rivet through aperture 27, rivets also pass through holes 29 into securement with base 10. The preferred form of attaching means secured to strap 25 by means of pin 28 is shown in Figure 1 as a threaded stud 30 having a single nut 31 arranged thereon to bear against collar 32.

A preferred form of rear hold-down anchor 35 is best seen in Figure 1, formed with a boxlike housing, seen in Figure 3, having a spring pressed engaging pin 36 therein. The housing is stamped out of sheet material provided with a side wall for securement to the upstanding leg 15 of side rails 11. This side wall is formed by bringing ears 37 and 38 toward each other from the front and rear walls 39 and 40 respectively, of the housing. Flanges 41 and 42 are extended forwardly from the front and rear walls 39 and 40 respectively. Flange 42 is arranged for securement to the upper surface of non-embossed portion of horizontally extending leg 18 of side rails 11. Front wall 39 is longer than rear wall 40, whereby in assembled relationship on base 10, it will extend through the slot formed in leg 18, as seen in Figure 9, and through slot 23 of rear end piece 21. Flange 41 is secured to the underside of end piece 21. Gussets 43 are formed on an eccentric line to strengthen the housing. Engaging pin 36 is positioned in the housing of rear anchor 35, as seen in Figure 1, so that a shoulder 45 on the pin bears against the inside of front wall 39. Spring 46 bears against shoulder 45 and rear wall 40 to force pin 36 to the extended position illustrated in Figure 1.

Vibration isolators V of any suitable type are secured to the base 10, as seen in Figure 1, and suitable grounding straps are provided between base 10 and the bottom of vibration isolators V which in the preferred embodiment are coupled to the front of the base by a pin passing through aperture 27 of emboss 26 of strap 25.

*Operation*

In operation, the illustrated mounting base embodying the herein-disclosed inventive concepts is arranged to support any member which it is desired to maintain in relatively vibration-free isolation. The mounting base here illustrated is shown of a rectangular configuration and is found to have optimum utility in supporting conventional electronic chassis in installations such as airplanes or the like. However, the teachings embodied in the illustrated base may readily be employed in conjunction with a variety of other installations.

Any member which it is desired to support on the illustrated novel base is provided with two apertures at the rear portion of its chassis, and two downwardly extending ears adapted for securement between the collar 32 and wing nut 31 of the front anchor 25. Spring pressed pin 36 will pass into the aforementioned apertures provided in the chassis of the member to be supported.

Any vibrations not damped out by vibration isolators V will, of course, be transmitted through mounting base 10. However, construction of the base is such that the vibration forces will have little or no effect on the structural rigidity of the base, since the points subject to maximum stress are provided with increased strength due to the utilization of embosses at these points. Thus, the side rails subject to a maximum bending moment at their centers are provided with emboss 17 at this point. The front anchoring straps 25 which are subject to being sheared off at their point of securement to the frame are provided with a dished emboss 26 at the point of maximum stress surrounding the point of attachment. Flanges 16 on side rails 11 increase the resistance of the side rails to lateral bending produced by any vibration forces. The arrangement of the housing of rear hold-down anchor is such that all stresses transmitted to said anchor produces only minimal tension strains which are readily withstood by the sheet material employed in fabrication of the mounting base. Shear stresses are substantially eliminated by passing leg 39 through rail 11. The arrangement of front connector 25 is such that upon failure of the rivets through holes 29, the member still is maintained in connection with isolator V.

The above disclosure has been given by way of illustration and elucidation, and not by way of limitation, and it is desired to protect all embodiments of the hereindisclosed inventive concepts within the scope of the appended claims.

What is claimed is:

1. A mounting base for supporting equipment in substantially vibration free isolation, said base comprising: a plurality of rails engaging the lower edge of the equipment to be supported; end pieces coupling said rails together and formed to reinforce same; a rear anchoring member extending through the rail and the end piece and secured thereto, said rear member formed in the shape of an inverted box like housing; a spring pressed engaging pin therein; a side wall on said housing secured to said rails; a front wall on said housing having a portion extending through the rail and end piece and engaged with a lower surface of said end piece whereby shear stresses are substantially eliminated; and a front anchoring member having an emboss and aperture therein secured to a rail and end piece, whereby the emboss strengthens the anchoring member at its point of maximum stress.

2. A mounting base for supporting equipment in substantially vibration free isolation, said base comprising: a plurality of rails engaging the lower edge of the equipment to be supported, each rail being of a right angle shape with an upwardly extending vertical leg, and a horizontal supporting leg; end pieces coupling said rails together; a rear anchoring member extending through the rail and the end piece and secured thereto, said rear member formed in the shape of an inverted box like housing; a spring pressed engaging pin therein; a side wall on said housing secured to said rails; a front wall on said housing having a portion extending through the rail and end piece and engaged with a lower surface of said end piece whereby shear stresses are substantially eliminated; and a front anchoring member having an emboss and aperture therein secured to a rail and end piece, whereby the emboss strengthens the anchoring member at its point of maximum stress.

References Cited in the file of this patent
UNITED STATES PATENTS

| | | |
|---|---|---|
| 2,441,510 | Robinson | May 11, 1948 |
| 2,687,270 | Robinson | Aug. 24, 1954 |

FOREIGN PATENTS

| | | |
|---|---|---|
| 500,694 | Canada | Mar. 16, 1954 |